United States Patent
Mewes et al.

(10) Patent No.: US 7,476,124 B2
(45) Date of Patent: Jan. 13, 2009

(54) FEEDTHROUGH CONNECTOR WITH PLATED ELECTRICAL TRACE

(75) Inventors: Michael Allen Mewes, Belle Plain, MN (US); Daniel Dennis Dittmer, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/642,332

(22) Filed: Dec. 19, 2006

(65) Prior Publication Data

US 2008/0144273 A1 Jun. 19, 2008

(51) Int. Cl.
 *H01R 12/24* (2006.01)
(52) U.S. Cl. ...................................... 439/495
(58) Field of Classification Search .................. 439/66, 439/495, 65, 70–71, 67, 492–493
 See application file for complete search history.

(56) References Cited

U.S. PATENT DOCUMENTS

| | | | |
|---|---|---|---|
| 6,053,744 A | | 4/2000 | Gray et al. |
| 6,168,459 B1 * | | 1/2001 | Cox et al. ................... 439/495 |
| 6,270,375 B1 | | 8/2001 | Cox et al. |
| 6,587,310 B1 | | 7/2003 | Bennin et al. |
| 6,856,490 B2 | | 2/2005 | Rosner et al. |
| 6,926,565 B2 * | | 8/2005 | Fogg ........................... 439/862 |
| 6,931,727 B2 * | | 8/2005 | Bulmer et al. ................ 29/882 |
| 6,966,784 B2 * | | 11/2005 | Van Schuylenbergh et al. ........................... 439/67 |
| 6,970,329 B1 | | 11/2005 | Oveyssi et al. |
| 7,137,826 B2 * | | 11/2006 | Brodsky et al. ............... 439/65 |
| 2002/0119696 A1 * | | 8/2002 | Okamura et al. ............ 439/495 |
| 2003/0081357 A1 | | 5/2003 | Hong et al. |

\* cited by examiner

*Primary Examiner*—Jean F Duverne
(74) *Attorney, Agent, or Firm*—Fellers, Snider, et al.

(57) ABSTRACT

An apparatus which establishes an electrical feedthrough for a substrate, such as a housing wall of a data storage device enclosure. A one-piece dielectric body has a base portion configured for support adjacent the substrate, a first projection extending from the base portion through an aperture of the substrate, and a second projection extending from the base portion opposite the first projection. At least one, and preferably a plurality of, electrically conductive traces are plated onto the dielectric body. The trace(s) continuously extend along the first projection, the base portion and the second projection. The dielectric body is preferably formed of a plateable plastic, and the trace(s) are preferably formed thereon using a suitable metallization process. A flex circuit comprising a substantially rectangular, flexible dielectric ribbon preferably attaches to the second projection to establish an electrical communication path with a component interior to the substrate, such as an actuator.

20 Claims, 5 Drawing Sheets

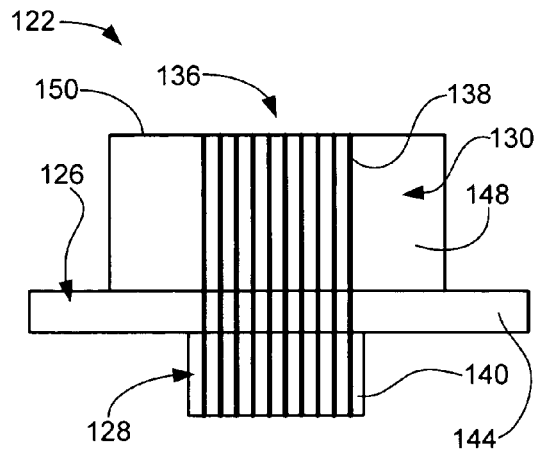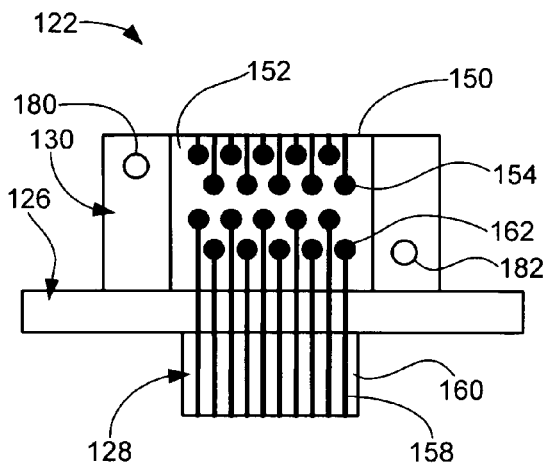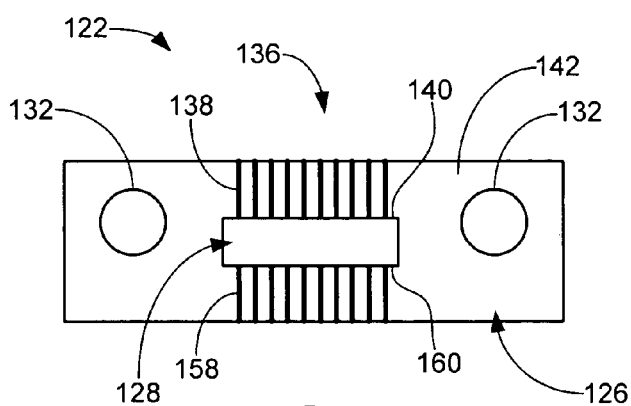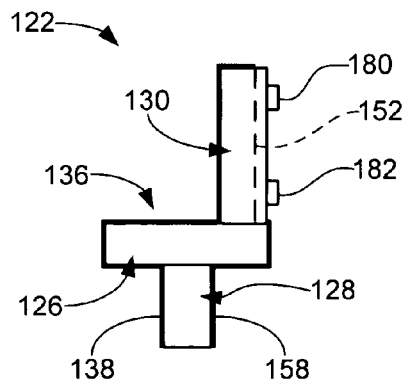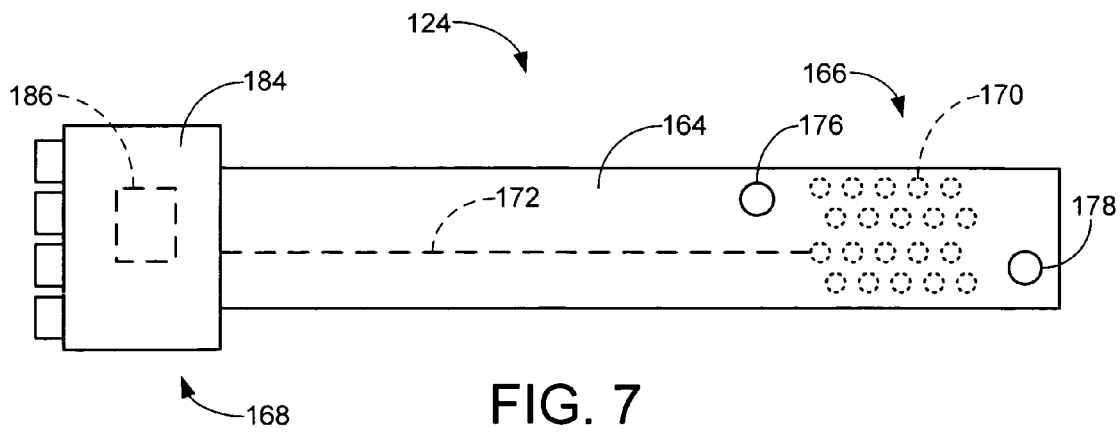

FEEDTHROUGH CONNECTOR WITH PLATED ELECTRICAL TRACE

FIELD OF THE INVENTION

The claimed invention relates generally to the field of enclosures for electrical and/or electro-mechanical systems and more particularly, but not by way of limitation, to a connector for establishing a feedthrough electrical connection through a substrate wall of an enclosure, such as in a data storage device.

BACKGROUND

The ongoing commercialization of digital data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), etc.

A disc drive is a type of mass storage device that generally stores data on one or more rotatable magnetic recording media. A corresponding array of data transducers (heads) are selectively moved across the surfaces of the media to transduce data therewith.

It is often generally desirable to provide a mass storage device with a sealed enclosure housing to protect the storage media and other components from particulate contamination, electrostatic discharge effects, damage during handling and transport, etc. A connector can be used to pass electrical signals between the interior of the housing and a circuit exterior to the housing.

With the continued demand for higher performance, smaller form factor electronic devices, there remains a continual need for improvements in the manner in which feedthrough connections can be established through an enclosure wall, such as in a data storage device. It is to these and other improvements that preferred embodiments of the present invention are generally directed.

SUMMARY OF THE INVENTION

Preferred embodiments of the present invention are generally directed to an apparatus for establishing an electrical feedthrough conductive path through a substrate, such as a housing wall of a data storage device enclosure.

In accordance with preferred embodiments, a one-piece dielectric body has a base portion configured for support adjacent the substrate, a first projection extending from the base portion through an aperture of the substrate, and a second projection extending from the base portion opposite the first projection.

An elongated, electrically conductive trace is preferably plated onto the dielectric body. The trace continuously extends along the first projection, the base portion and the second projection.

These and various other features and advantages that characterize preferred embodiments of the claimed invention will be apparent upon reading the following detailed description and upon review of the associated drawings.

BRIEF DESCRIPTION OF THE DRAWINGS

FIG. 3 provides a front elevational representation of the connector of FIG. 2.

FIG. 4 provides a back elevational representation of the connector of FIG. 2.

FIG. 5 provides a bottom plan view of the connector of FIG. 2.

FIG. 6 provides a side elevational view of the connector of FIG. 2.

FIG. 7 illustrates a flex circuit configured for attachment to the connector of FIG. 2 to form a flex circuit assembly.

DETAILED DESCRIPTION

Figure 1:
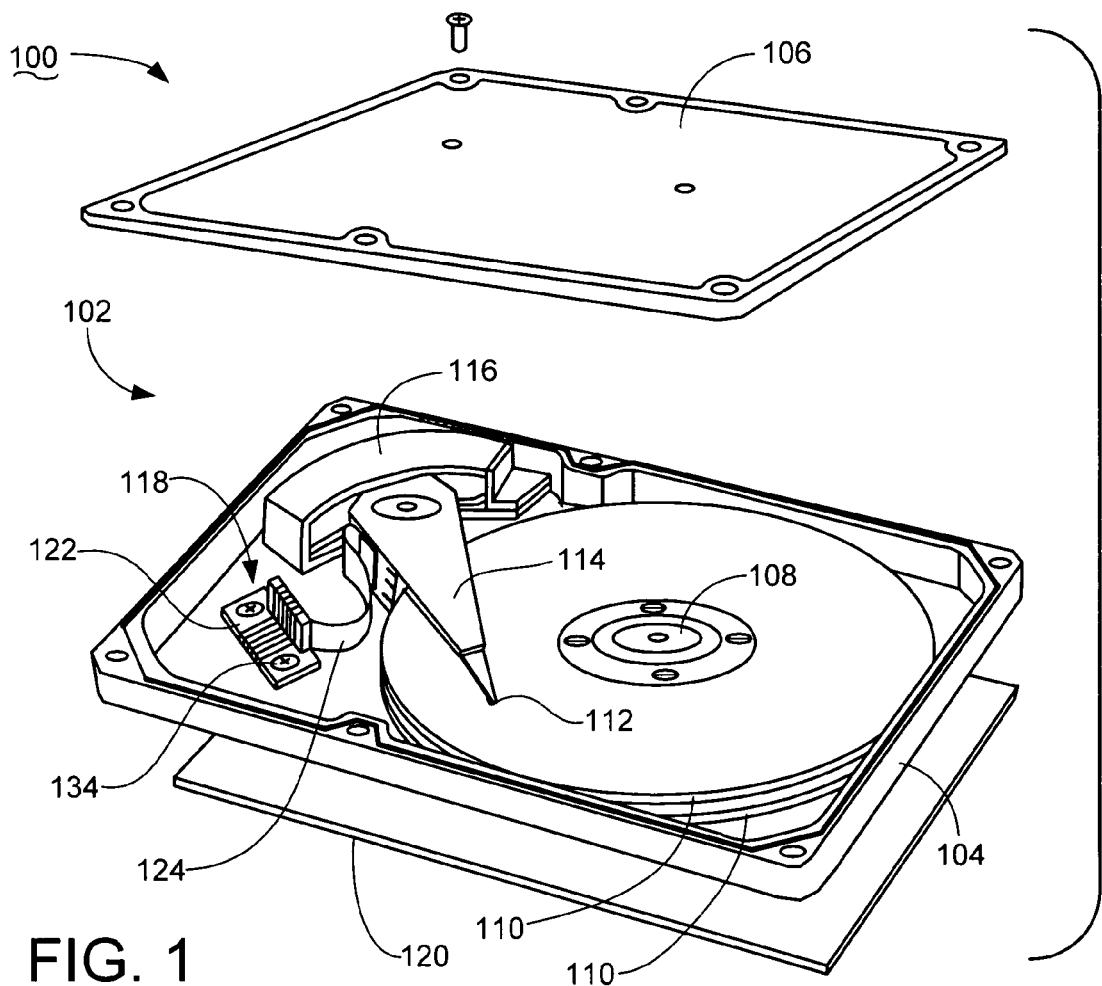
FIG. 1 is an exploded isometric view of an exemplary data storage device in which preferred embodiments of the present invention can be advantageously practiced.

FIG. 1 provides a top plan view of a data storage device 100. The drive 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.) and other types of media (such as optical media, etc.) can alternatively be utilized as desired.

A head-stack assembly ("HSA" or "actuator") is shown at 114. The actuator 114 preferably rotates through application of current to a voice coil motor (VCM) 116. Controlled operation of the VCM 116 causes the transducers 112 to align with tracks (not shown) defined on the media surfaces to store data thereto or retrieve data therefrom.

FIG. 1 further shows a flex circuit assembly 118 configured to establish electrical communication paths between the actuator 114 and device control electronics on an externally disposed printed circuit board (PCB) 120. The flex circuit assembly 118 preferably includes VCM signal paths to accommodate the application of current to the VCM 116, and I/O signal paths to accommodate the transfer of write data to the media 110 and readback data from the media 110, respectively.

Figure 2:
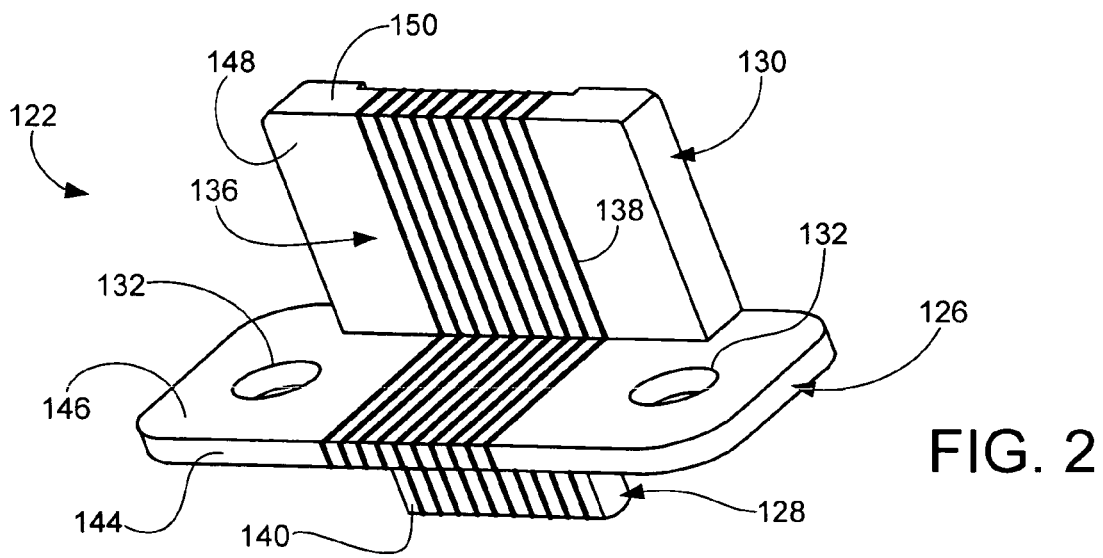
FIG. 2 provides an isometric representation of a connector of the device of FIG. 1 in accordance with preferred embodiments of the present invention, the connector configured to pass electrical signals through the device housing.

The flex circuit assembly 118 preferably comprises a bulkhead connector 122 and a flex circuit 124. As shown in FIG. 2, the connector 122 preferably comprises a base portion 126 and first and second leg projections 128, 130 extending therefrom. Opposing apertures 132 accommodate threaded fasteners 134 (FIG. 1) used to secure the connector 122 to the base deck 104.

As further shown in FIGS. 3-6, the first projection 128 preferably extends downwardly from the base portion 126 to form a substantially T-shaped cross-section. In this way, the fasteners 134 compressively engage the base portion 126 against the base deck 102 while the first projection 128 extends through a central aperture (not shown) in the base deck to a distal position adjacent the PCB 120.

The second projection 130 preferably extends upwardly from the base portion 126 to form a substantially L-shaped cross-section. This arrangement preferably facilitates attachment of the flex circuit as explained below.

The base portion 126, the first projection 128 and the second projection 130 are all preferably formed as a one-piece dielectric body. At least one, and preferably a plurality, of spaced-apart electrically conductive traces 136 are plated onto the dielectric body to continuously extend along the first leg projection, the base portion and the second leg projection. The traces 136 are preferably formed of a suitable metal, such as gold, copper, nickel, silver, etc.

Preferably, the traces 136 are selectively routed along opposing sides of the connector 122. As shown in FIGS. 2-6, a first set of the traces is numerically denoted at 138. These traces 138 preferably extend along a path including a front surface 140 of the first projection 128 (see FIGS. 2 and 3); a bottom surface 142 of the base portion 126 (FIG. 5); a leading edge surface 144 of the base portion 126 (FIGS. 2-3); a top surface 146 of the base portion 126 (FIG. 2); a front surface 148 of the second projection 130 (FIG. 3); a top surface 150 of the second projection 130 (FIG. 2); and a back surface 152 of the second projection 130 (FIG. 4). The first set of traces 138 preferably terminate with a corresponding number of spaced-apart solder pads 154 on the back surface 152, as shown in FIG. 4.

A second set of the traces is numerically denoted at 158. These traces 158 preferably extend along a path including a back surface 160 of the first projection 128 (see FIGS. 4-5); the bottom surface 142 of the base portion 126 (FIG. 5); and the back surface 152 of the second projection 130 (FIGS. 4 and 6). The second set of traces 158 also preferably terminate at a corresponding number of spaced-apart solder pads 162 on the back surface 152 (FIG. 4).

The one-piece dielectric body of the connector 122 can be formed from any number of suitable materials. In a preferred embodiment, the dielectric body is formed from plateable plastic such as liquid crystal polymer (LCP) commercially available from Molex Corporation, Lisle, Ill., U.S.A. While a variety of techniques can be used to form the connector 122, in a preferred embodiment a multi-stage molding process is used. A first molding operation forms a plastic base of plateable plastic or similar material. The base is next selectively overmolded with a non-plateable plastic or similar material, leaving the underlying layer exposed in locations for the traces and pads. A metallization process is next applied to form the traces and pads. A technique used as described above to derive three dimensional circuits on a dielectric substrate is sometimes referred to as a molded interconnect devices (MID) process.

It will be appreciated that while plateable plastic is preferred, such is not necessarily required. Other base materials can be readily used as desired, such as ceramics. Also, the body can be internally conductive with a surface dielectric layer applied thereto, such as an extruded metal part selectively overmolded with a plateable outer layer (such as the aforementioned plateable plastic); in such cases the body would still be characterized as a dielectric body for purposes herein. Additional processes, such as laser etching, can also be preferably employed to fabricate the connector 122. It is noted that plating the traces onto the underlying dielectric portions of the connector 122 provides a single piece rigid support for the traces, and can significantly reduce manufacturing complexity and costs.

FIG. 7 illustrates the aforementioned flex circuit 124. The flex circuit 124 preferably comprises a substantially rectangular shaped flexible dielectric ribbon 164 supporting with opposing first and second ends 166, 168. The first end 166 of the ribbon 164 is configured for attachment to the back surface 156 of the second projection 130, and the second end 168 of the ribbon 164 is configured for attachment to the actuator 114 (FIG. 1).

As shown in FIG. 7, the first end 166 is provisioned with a number of solder pads 170 which contactingly engage the solder pads 154, 162 of the connector 122 (FIG. 4). A corresponding number of traces (one shown in broken line fashion at 172 extend along the length of the ribbon 164. Alignment apertures 176, 178 of the flex circuit 124 are configured to respectively receive alignment posts 180, 182 (FIG. 4) of the connector 122 to align the ribbon 164 onto the second projection 130.

The second end 168 of the ribbon 164 terminates at a support plate 184 which supports circuitry and connections for the actuator 114, including a preamplifier/driver circuit 186 (see FIGS. 1 and 7). It will be noted that the solder pads 170 for the connector 122, and the solder pads for the preamp 186 and other circuitry/connections are all preferably located on the same side of the ribbon 164. This simplifies the assembly process since all components can be placed onto the ribbon 164 without the need to turn the ribbon over. It will be appreciated that in alternative embodiments other connections, including the use of separate connectors, are used to interconnect with the connector 122.

Figure 8:
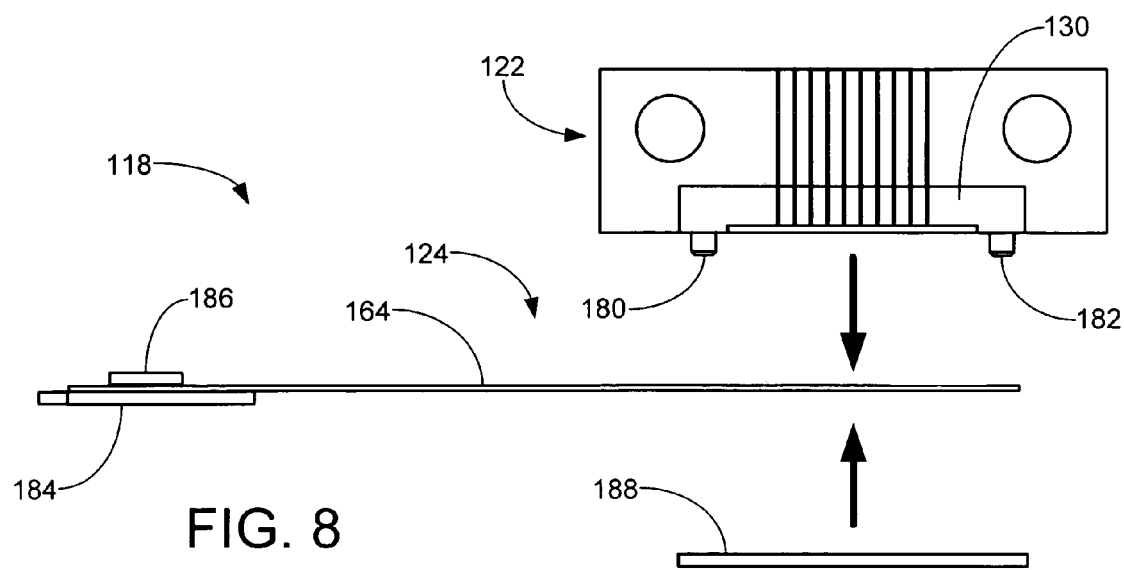
FIG. 8 generally sets forth a preferred assembly sequence for the flex circuit assembly.

The flex circuit assembly 118 is preferably fabricated by supporting the flex circuit 124 in a flat, planar orientation as represented in FIG. 8. The connector 122 is preferably lowered onto the first end 166 of the ribbon 164 to insert the alignment posts 180, 182 through the apertures 176, 178. A solder reflow operation is preferably applied to connect the respective solder pads 154, 162 of the connector 122 to the solder pads 170 of the flex circuit 124. The ribbon 164 and the second projection 130 are preferably configured as shown to permit visual inspection of the solder joints after the reflow process (such as through an automated optical inspection system, not shown).

Figure 9:
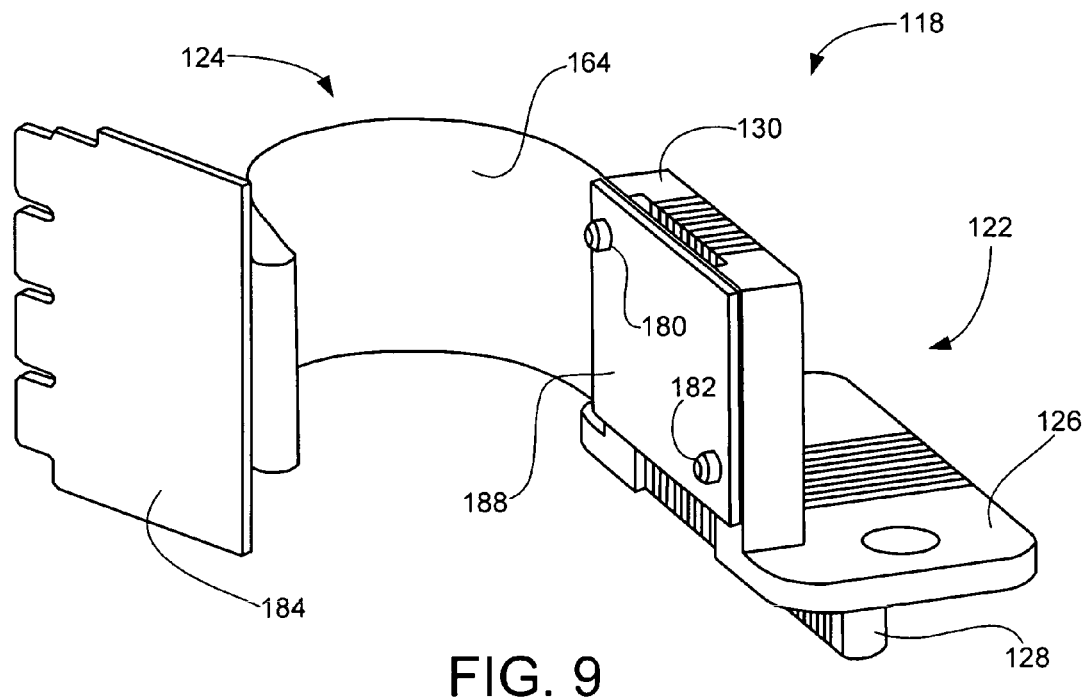
FIG. 9 shows an isometric representation of the assembled flex circuit assembly of FIG. 8.

An isometric representation of the completed flex circuit assembly 118 is set forth in FIG. 9. As desired, a support plate 188 is attached so that the ribbon 164 is between the plate 188 and the second projection 130. The support plate 188 is preferably formed of aluminum, but other materials may be readily used as desired. The plate provides support for the electrical connections of the pads, as well as provides dynamic loop control for a medial portion of the ribbon 164. These respective operations can readily be carried out in an automated manufacturing environment.

Figure 10:
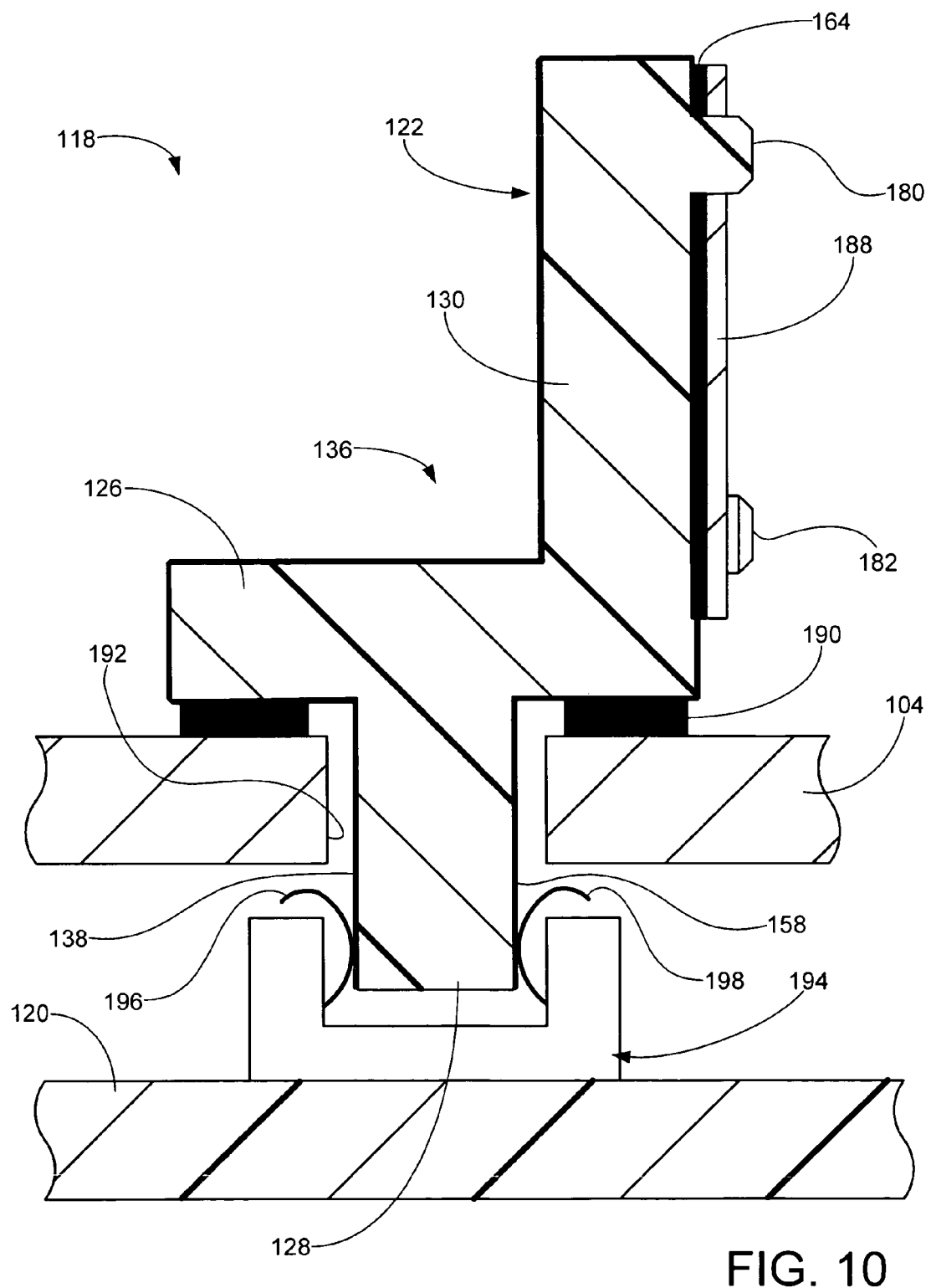
FIG. 10 provides a generalized, cross-sectional representation of the connector and the flex circuit assembly installed in the device of FIG. 1 in accordance with a preferred embodiment.

The assembly 118 is next preferably installed onto the base deck 104 as shown by FIG. 10. Preferably, a sealing member 190 is placed between the connector 122 and the base deck 104 along the periphery of the base portion 126. The first projection 128 is inserted through a base deck aperture 192 and the fasteners 134 (FIG. 1) secure the connector 122 to the base deck, thereby compressing the sealing member 190 to effect an atmospheric seal.

A suitable connector 194 is supported by the PCB 120, and preferably includes electrically conductive lateral spring tabs 196, 198 that engage the respective sets of traces 138, 158. In this way, feedthrough electrical conductive paths are established between the control electronics (not shown) on the PCB 120 and the actuator 114. The use of lateral spring tabs such as 196, 198 place the compressive forces against the respective traces 138, 158 in a direction substantially parallel to the PCB 120, not perpendicular as in some prior art designs. This reduces stresses and/or deflection of the PCB 120 in the vertical plane during insertion.

Figure 11:
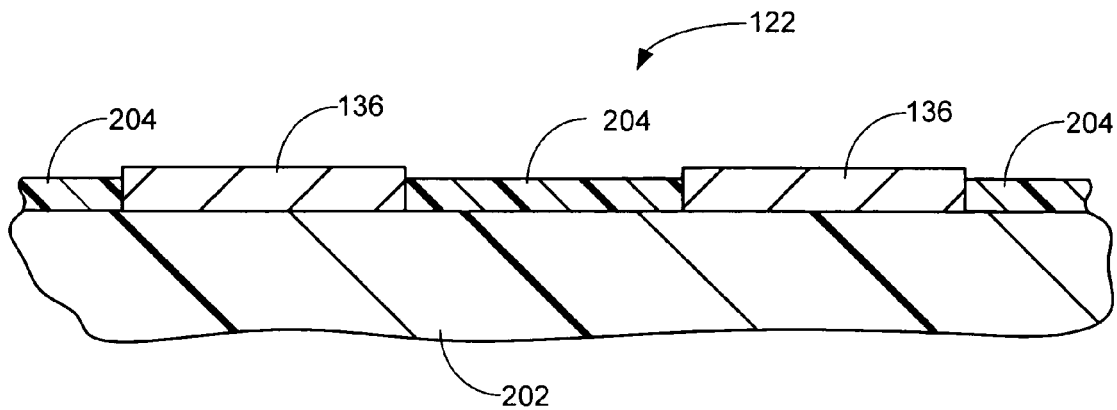
FIG. 11 provides a cross-sectional representation of a preferred construction for the dielectric body of the connector of FIG. 1.

Referring again to the connector 122 as illustrated in FIG. 10, the connector is preferably formed from a plateable plastic material as described above. As shown in the expanded, cross-sectional view of FIG. 11, an inner layer of plateable plastic 202 is first molded, followed by an outer layer of non-plateable plastic 204 to provide the requisite masking. Traces 136 are then plated using a suitable metallization process onto the exposed inner layer 202 and adjacent the masking outer layer 204.

Figure 12:
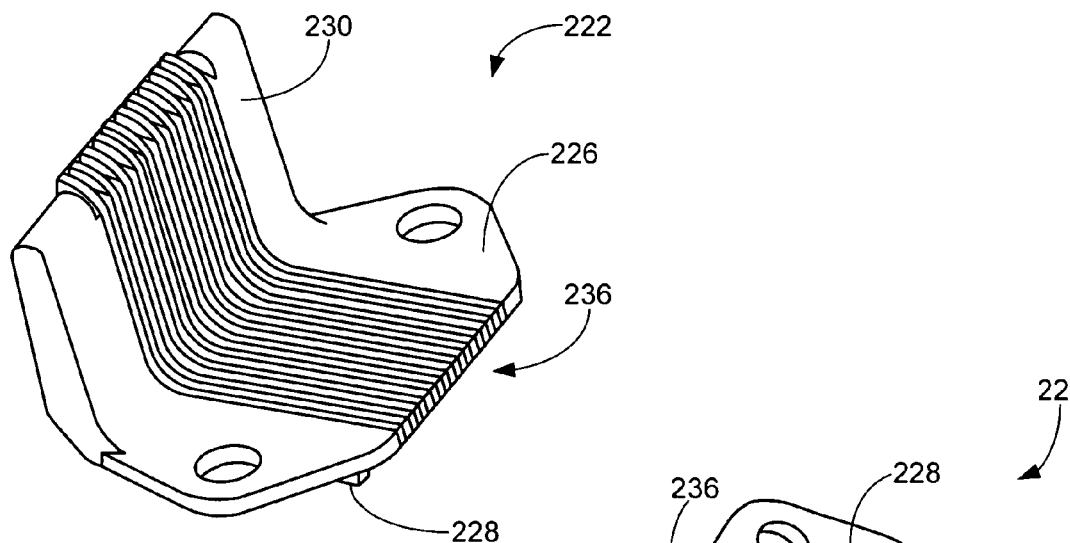
FIGS. 12 and 13 provide respective top and bottom isometric views of an alternative connector constructed in accordance with preferred embodiments of the present invention.
Figure 13:
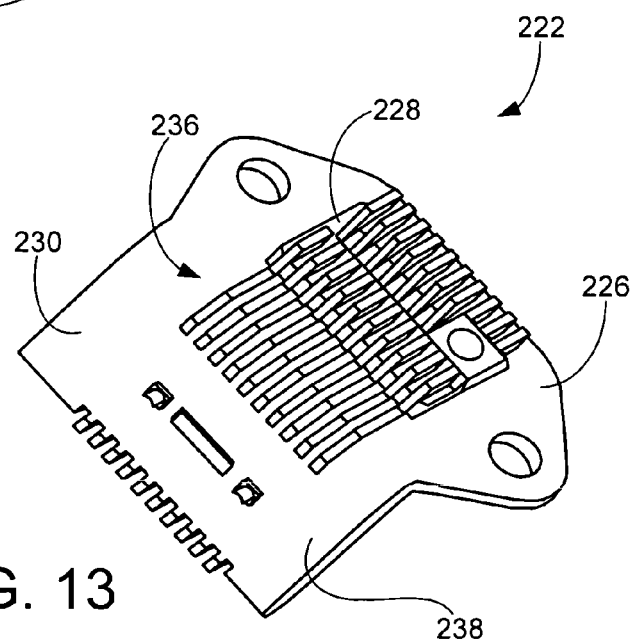

Any number of structural configurations can be readily applied to the connector depending on the requirements of a given application. An alternative configuration for a connector 222 is set forth in FIGS. 12 and 13. The connector 222 generally includes a base portion 226, a first projection 228 and a second projection 230. Electrical traces 236 are plated onto the front and back sides of the connector 222 for engagement with a suitable, vertical compression PCB connector (not shown).

The traces 236 are further routed to a back surface 238 of the second projection 228 for mating engagement with a rectangular flex circuit (not shown). As before, the base portion 226 and first projection 228 preferably form a substantially T-shaped cross-section, and the base portion 226 and the second projection 230 preferably form a substantially L-shaped cross-section.

It will now be appreciated that the various preferred embodiments discussed herein provide advantages over the prior art. A one-piece unitary construction (such as exemplified by the connectors 122, 222) provides an easily manufacturable component that reduces part counts and generally provides improved structural support and electrical signal performance for the traces.

The connector facilitates the use of a simple, one-piece rectangular configuration for the flex ribbon, which substantially improves PCC panelization (i.e., reduces waste in the base material from which the flex ribbon is cut), as well as eliminates various folding and routing steps as commonly required in the prior art. An automated, top-down assembly process can readily be used to assemble the entire flex circuit assembly, as well as to install the completed assembly onto a substrate.

The connector 122, 222 further advantageously facilitates the use of a gold-on-gold interface with reduced compression loading, which enhances reliability and signal performance at the PCB connector interface. The sealing member 190 can be made of any durable elastomer, such as rubber, which can be directly placed across the traces 138, 158 to form an effective seal and to electrically insulate the traces from the substrate (e.g., base deck 104).

Further advantages include the ability to adjust the center of gravity of the connector 122, 222 to enhance stability during the reflow operation. The various transitional edges along the connector can be radiused as desired to enhance durability of the traces during handling. The traces can also be provisioned with a very simple linear routing around the connector body, as exemplified herein, which further simplifies manufacturability.

While presently preferred embodiments characterize the exemplified connector 122, 222 as a feedthrough connector for use in a data storage device, it will be appreciated that this is merely for purposes of disclosing a preferred embodiment, and is not limiting. Rather, the claimed structure can be readily used to establish an electrical feedthrough connection through any type of substrate as desired, depending on the requirements of a given application, such as the provision of power and/or data I/O signals directly to or from a host device.

For purposes of the appended claims, the recited first means will be understood to correspond to the disclosed connector 122, 222 onto which one or more traces 136, 138, 158, 236 are directly plated using a suitable metallization process. Prior art structures, such as structures that route a separate flex circuit with associated traces along a rigid base member do not have the plated traces as set forth herein and are expressly excluded as an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a one-piece dielectric body comprising a base portion configured for support adjacent a planar substrate, a first projection extending from the base portion and configured to extend through an aperture of the planar substrate, and a second projection extending from the base portion opposite the first projection;
   an elongated, electrically conductive first trace plated onto the dielectric body and which continuously extends along the first projection, the base portion and the second projection;
   a flex circuit comprising a substantially rectangular, flexible dielectric ribbon;
   a second trace supported along the ribbon, a first end of the flex circuit attached to the second projection so that the first trace is in electrical communication with the second trace; and
   a plate attached to the second projection so that the first end of the flex circuit is compressed between the second projection and the plate.

2. The apparatus of claim 1 wherein the second end of the flex circuit is attached to a rotatable actuator of a data storage device, and wherein the plate controls a dynamic loop of a medial portion of the flex circuit during movement of said actuator.

3. The apparatus of claim 2, wherein the base portion and the first projection substantially form a T-shaped cross-section.

4. The apparatus of claim 3, wherein the base portion and the second projection further substantially form an L-shaped cross-section.

5. The apparatus of claim 1, wherein the electrically conductive trace is characterized as metal.

6. The apparatus of claim 1, wherein the dielectric body comprises plateable plastic.

7. The apparatus of claim 1, wherein a second end of the flex circuit is attached to a moveable actuator disposed within the housing.

8. The apparatus of claim 1, wherein the dielectric body comprises an inner plateable layer of plastic to which the first trace is plated, and an outer non-plateable layer of plastic overmolded onto the inner plateable layer of plastic adjacent said first trace.

9. An apparatus comprising:
a one-piece dielectric body comprising a base portion configured for support adjacent a planar substrate, and a first projection extending from the base portion and configured to extend through an aperture of the planar substrate; and
an elongated, electrically conductive trace plated onto the dielectric body and which continuously extends along the first projection and the base portion;
wherein the apparatus is characterized as a feedthrough connector of a data storage device, wherein the substrate comprises a wall of an enclosed housing of the data storage device through which the first projection extends to establish an electrical connection with a circuit external to said enclosed housing.

10. The apparatus of claim 9, wherein the base portion and the first projection substantially form a T-shaped cross-section.

11. The apparatus of claim 10, wherein the base portion and the second projection further substantially form an L-shaped cross-section.

12. The apparatus of claim 9, wherein the electrically conductive trace is characterized as metal.

13. The apparatus of claim 9, wherein the dielectric body comprises plateable plastic.

14. The apparatus of claim 9, wherein a second end of the flex circuit is attached to a moveable actuator disposed within the housing.

15. The apparatus of claim 9, wherein the dielectric body further comprises a second projection extending from the base portion opposite the first projection, and wherein the electrical trace further continuously extends along the second projection.

16. An apparatus comprising:
a one-piece dielectric body comprising a base portion configured for support adjacent a planar substrate, and a first projection extending from the base portion and configured to extend through an aperture of the planar substrate;
an elongated, electrically conductive trace plated onto the dielectric body and which continuously extends along the first projection and the base portion, the dielectric body formed of plastic, the plastic comprising:
an inner plateable layer of plastic to which the trace is plated; and
an outer non-plateable layer of plastic overmolded onto the inner plateable layer of plastic adjacent said trace.

17. The apparatus of claim 16, wherein the base portion and the first projection substantially form a T-shaped cross-section.

18. The apparatus of claim 16, wherein the electrically conductive trace is characterized as metal.

19. The apparatus of claim 16, wherein a second end of the flex circuit is attached to a moveable actuator disposed within the housing.

20. The apparatus of claim 16, wherein the dielectric body further comprises a second projection extending from the base portion opposite the first projection, and wherein the electrical trace further continuously extends along the second projection.

* * * * *